United States Patent
Ivanovic et al.

(10) Patent No.: US 12,407,873 B2
(45) Date of Patent: Sep. 2, 2025

(54) METRIC DRIVEN ADAPTIVE PROCESSING FOR VIDEO ENCODERS

(71) Applicant: ATI TECHNOLOGIES ULC, Markham (CA)

(72) Inventors: Boris Ivanovic, Markham (CA); Mehdi Saeedi, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 16/453,377

(22) Filed: Jun. 26, 2019

(65) Prior Publication Data

US 2020/0413105 A1 Dec. 31, 2020

(51) Int. Cl.
- *H04N 19/91* (2014.01)
- *H04N 19/117* (2014.01)
- *H04N 19/176* (2014.01)
- *H04N 19/60* (2014.01)

(52) U.S. Cl.
CPC ........... *H04N 19/91* (2014.11); *H04N 19/117* (2014.11); *H04N 19/176* (2014.11); *H04N 19/60* (2014.11)

(58) Field of Classification Search
None
See application file for complete search history.

(56) References Cited

U.S. PATENT DOCUMENTS

| | | | | |
|---|---|---|---|---|
| 6,002,801 A * | 12/1999 | Strongin | ................ | H04N 19/60 375/240.18 |
| 6,895,048 B2 * | 5/2005 | Boice | ................... | H04N 19/159 375/240 |
| 8,179,974 B2 * | 5/2012 | Tu | ........................ | H04N 19/176 375/240.24 |
| 9,955,160 B1 * | 4/2018 | Yadav | .................. | H04N 19/117 |
| 10,694,178 B2 * | 6/2020 | Jun | ...................... | H04N 19/115 |
| 2006/0034539 A1 * | 2/2006 | Nachlieli | ............... | H04N 19/60 382/260 |
| 2007/0116125 A1 * | 5/2007 | Wada | ..................... | H04N 19/85 375/240.16 |
| 2007/0206871 A1 * | 9/2007 | Jalil | ..................... | H04N 19/527 382/233 |
| 2010/0166073 A1 * | 7/2010 | Schmit | ................... | H04N 19/51 375/240.16 |
| 2013/0094571 A1 * | 4/2013 | Zhang | ................. | H04N 19/152 375/240.03 |
| 2016/0366413 A1 * | 12/2016 | Zhang | ................... | H04N 19/82 |
| 2017/0155924 A1 * | 6/2017 | Gokhale | ........... | H04N 19/1883 |
| 2018/0176562 A1 * | 6/2018 | Iwamura | .............. | H04N 19/625 |
| 2019/0045217 A1 * | 2/2019 | Gokhale | ............. | H04N 19/142 |
| 2019/0089957 A1 * | 3/2019 | Zhang | ................. | H04N 19/146 |
| 2019/0246138 A1 * | 8/2019 | Terterov | ................ | H04N 19/86 |
| 2020/0413105 A1 * | 12/2020 | Ivanovic | ............... | H04N 19/10 |

OTHER PUBLICATIONS

Richardson, Iain E., "The H.264 Advanced Video Compression Standard", Chapter 6, Second Edition, 2010, pp. 137-177.

\* cited by examiner

*Primary Examiner* — Chikaodili E Anyikire

(57) ABSTRACT

A method includes obtaining, at a data reduction module, metrics of a first block of an input video frame and a second block of a reference frame. The data reduction module includes an analysis module and a filter. A perceptual importance of the first block of the input video frame is determined at the analysis module using the metrics. An entropy of the input video frame provided to an encoder is adjusted at the filter of the data reduction module based on the perceptual importance of the first block of the input video frame.

23 Claims, 6 Drawing Sheets

US 12,407,873 B2

METRIC DRIVEN ADAPTIVE PROCESSING FOR VIDEO ENCODERS

BACKGROUND

In wireless and computer-based video devices, users of video applications typically use vast amounts of video data in order to attain their daily intake of video content. As a result, providers of video content, as well as the manufacturers of the electronic devices that render video applications, are striving to reduce the cost associated with encoding the video applications, since encoding of the video data is a primary bottleneck in video delivery systems. In order to save costs, some manufacturers utilize conventional video encoding techniques that compress the video content only at the encoder and rely primarily on the modification of quantization parameters (QP). Other video encoding techniques limit the bandwidth of video applications but tend to change the resolution of the video, thereby reducing the quality of the video in order to compress the video data. However, such conventional techniques are non-optimal because they generally compress the entire video image at the same rate, potentially reducing quality even in areas where universal video compression is not required.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate systems and techniques for encoding video in a video processing system in a manner that reduce the bandwidth required to render the video content. Prior to an encoder receiving input video frames, the input video frames undergo pre-encoding analysis and, based on the results of the analysis, either provide the input video frames to the encoder or filter the input video frames at a data analysis and reduction module. Filtering the input video frames allows the data analysis and reduction module to reduce the entropy of the input video frames as provided to the encoder. During a data analysis and reduction stage, an analysis module generates a perceptual importance parameter related to macroblocks, sub-blocks, or localities of current input video frames and previously processed reference frames using metrics or parameters of both the current input video frames and the reference frames. A filter uses the perceptual importance parameter to reduce or not reduce the entropy represented in the input video frame provided to the encoder prior to undergoing the encoding process. In addition to the ability to reduce entropy of the input video frame to the input of the encoder, in some embodiments the video processing system employs a transform domain filter or a lossy entropy shaper to reduce the bandwidth required during the encoding process. The transform domain filter uses transform coefficients output by the transform module of the encoding system and an energy calculation of the transform coefficients indicative of the perceptual importance of the current macroblock to generate a new set of transform coefficients that are provided to the quantizing module of the encoder at a reduced bitrate. The lossy entropy shaper uses a comparison of a set of quantized transform coefficients output from the quantization module to sets of alternative quantized transform coefficients generated at the lossy entropy shaper to render a set of alternative quantized transform coefficients at the entropy module that are at a reduced bitrate compared to the original set of quantized transform coefficients. Both transform domain filtering and lossy entropy shaping may be used in combination with the data reduction module to generate an encoded frame at a reduced bitrate at the output of the encoder for view by a user of the video processing system.

Figure 1:
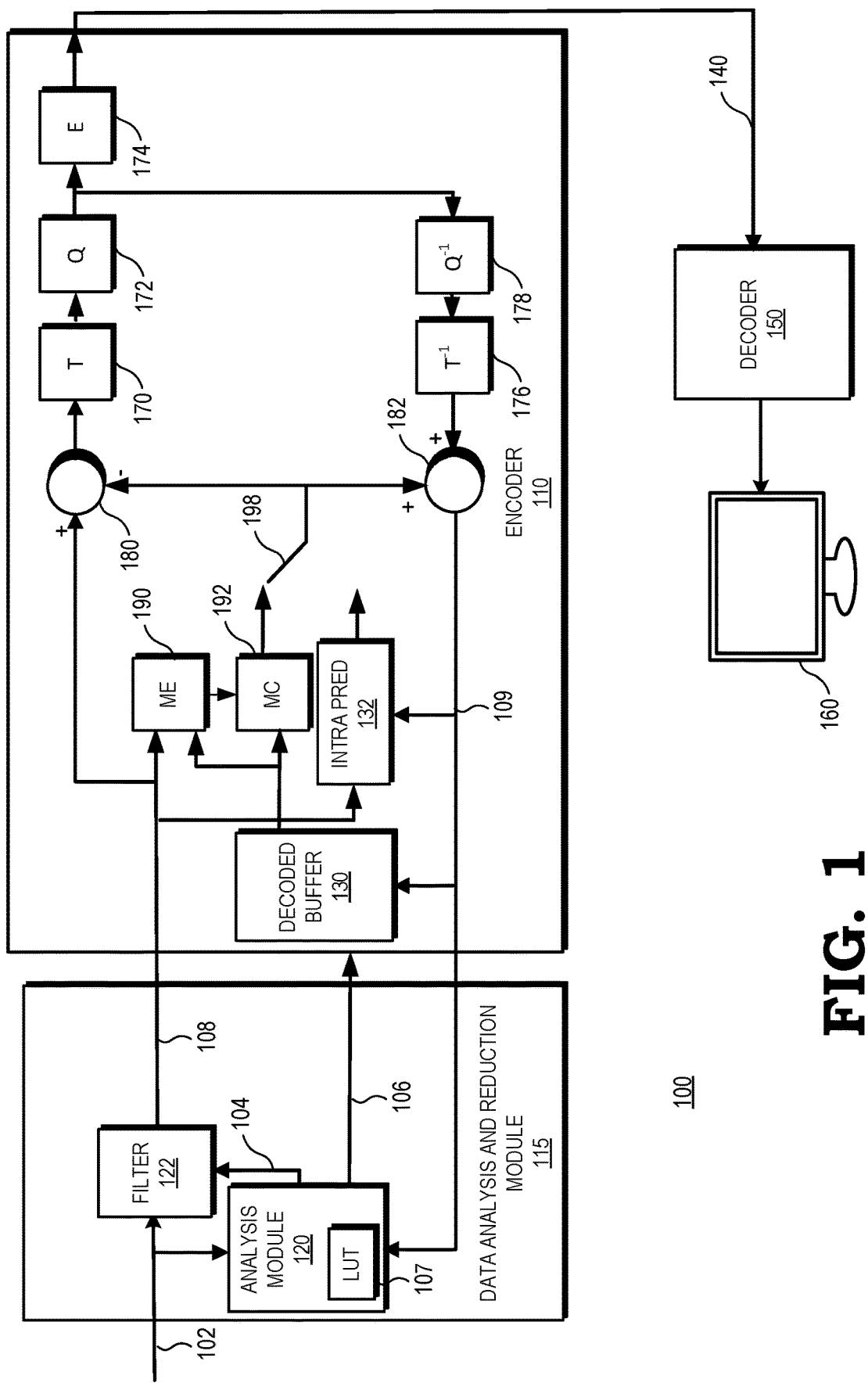
FIG. 1 is a block diagram of a video processing system configured to encode video based on pre-encoding analysis and filtering in accordance with some embodiments.

FIG. 1 illustrates a block diagram of a video processing system 100 configured to encode video based on pre-encoding analysis and filtering in accordance with some embodiments. The video processing system 100 includes a data reduction module 115, an encoder 110, a decoder 150, and a display 160. Data reduction module 115 includes an analysis module 120 and a filter 122. Encoder 110 includes a decoded buffer 130, a motion estimation (ME) module 190, a motion compensation (MC) module 192, an intra prediction module 132, a switching module 198, an adder module 180, an adder module 182, a transform module 170, a quantization module 172, an inverse transform module 176, an inverse quantization module 178, and an entropy module 174. The modules described herein may be implemented as hardwired or hardcoded logic and other circuitry, programmable logic, one or more processors executing one or more sets of instructions configured to manipulate the one or more processors to implement the functionality described herein, or a combination thereof.

The encoder 110 of video processing system 100 is configured to receive digital information from a video source (not shown), where the digital information represents a stream or sequence of image frames, such as input video frame 102, in a multimedia stream. The term "multimedia" refers to either video only or a combination of video and audio. The encoder 110 encodes the digital information for transmission over a communication channel such as a wide area network (WAN), an intranet, an internet, a wireless network, and the like. For example, in some embodiments the encoder 110 is used to encode the digital information according to an encoding standard such as Moving Picture Expert Group ("MPEG")-2, MPEG-4, Advanced Video Coding ("AVC"), and the like. In some embodiments, the encoder 110 is a hardware encoder or software executed by the one or more processors. In some embodiments, encoder 110 compresses video content using a two-dimensional (2D) video codec or a multiview video codec (MVCs) such as, but not limited to, H.264/MVC, H.265 (HEVC), VP8, VP9, AV1.

During operation, the input video frame 102 is presented at video processing system 100 from the video source (not shown) for data analysis and reduction. In order to reduce the bandwidth required of encoder 110 during the encoding process, the input video frames 102 are initially input to filter 122 and analysis module 120 of data reduction module 115 prior to being input into encoder 110 to perform bandwidth reduction. The analysis module 120 receives the input video frames 102 from the video source and the reference frames 109 from the encoder 110 and produces analysis output 104, which is used by filter 122 to reduce the entropy of the input video frames 102 to yield filtered frames 108 that are provided to encoder 110. In various embodiments, filter 122 may be, for example, a low-pass filter, a high pass filter, or other type of filter used for filtering out various video content. In various embodiments, filtering may depend on, for example, local content and may not be the same for the entire frame. In various embodiments, entropy reduction or detail reduction, may include, for example, 2D blur or noise reduction, 3D blur or noise reduction, or some combination thereof.

In order to generate analysis output 104, analysis module 120 examines current input video frames (input video frames 102) and previous video frames (reference frames 109) to eliminate unnecessary data from the macroblocks that formulate the input video frames 102. In various embodiments, the input video frames 102 and reference frames 109 are examined as an entire frame, macroblock, sub-block, or locality (combination of sub-blocks) based on metrics (or parameters) specified in, for example, a look-up table (LUT) 107. The metrics are features of the video content or input video frames 102 or reference frames 109 that include, for example, contrast content, flesh-tone content, memory color content, frequency content, energy content, motion content, and other parameters that influence the human visual system. For example, in various embodiments, analysis module 120 compares the contrast content of the current macroblock of input video frame 102 with the contrast content of a macroblock of the reference frame 109 to ascertain the contrast content difference between the current macroblock and reference frame macroblock. Analysis module 120 uses the calculated difference to generate analysis output 104, which is indicative of the perceptual importance of the macroblock of the input video frame 102. That is, analysis module 120 uses the resulting difference to determine whether the current macroblock is perceptually important to the user of the video content. The output of analysis module 120 (analysis output 104) is the perceptual importance of the macroblock of the input video frame 102 or a perceptual importance of the sub-block or locality of the input video frame 102.

In various embodiments, when the difference between the metrics of a macroblock, sub-block, or locality of the input video frame 102 and the metrics of a macroblock, sub-block, or locality of the reference frame 109 is less than a difference value of a plurality of difference values specified in the LUT 107, then the perceptual importance of the macroblock, sub-block, or locality is deemed significant and the filter 122 does not remove the macroblock, sub-block, or locality from the input video frame 102 that is provided encoder 110. When the difference between the metrics of a macroblock, sub-block, or locality of the input video frame 102 and the metrics of a macroblock, sub-block, or locality of the reference frame 109 is greater than the difference value specified in the LUT 107, then the perceptual importance of the macroblock, sub-block, or locality is deemed insignificant and the macroblock, sub-block, or locality is removed by filter 122 to generate filtered frame 108. Analysis module 120 provides the analysis output 104 to filter 122 and control settings 106 to encoder 110.

Concurrent to providing analysis output 104 to filter 122, analysis module 120 provides control settings 106 to encoder 110. The control settings 106 are generated by analysis module 120 and are configured to provide encode options, video quality, bit-rate, and rate-control to encoder 110. The control settings 106 generated by analysis module 120 may be global control settings or per-block or per locality control settings and may also be generated using the LUT 107. Per-block or per-locality control settings include local quality settings such as, quantization parameters (QP) of a macroblock, coding tree blocks (CTB), largest coding module (LCU), in addition to mode parameters and partitioning parameters of the various codecs listed above. The output of analysis module 120, i.e., control settings 106 and analysis output 104, are provided to encoder 110 and filter 122, respectively.

Filter 122 receives the output from the analysis module 120 and uses analysis output 104 to generate a filtered version of the input video frames 102 (filtered video frames 108) that have been reduced in bandwidth. Thus, the function of filter 122 is to use the perceptual importance provided by analysis module 120 to remove detail, noise or entropy within macroblocks, sub-blocks, or localities from the input video frame 102 that are perceptually insignificant to the viewer of the video content. In various embodiments, by removing the perceptually insignificant features of the input video frame 102, filter 122 is configured to remove unwanted noise or frequency signals that correspond to the perceptually insignificant features of the video content, which typically includes the lower frequencies of the input video frame 102. Thus, filter 122 may include, for example, a low pass filter or noise filter or combination thereof capable of removing a specific band or type of frequencies and/or noise from the input video frame 102. The output of filter 122 (filtered frames 108) are provided at a reduced bit rate (compared to the input video frames 102) to encoder 110.

After undergoing the data reduction process at data reduction module 115, the filtered frames 108 are received by encoder 110 at adder module 180, motion estimation module 190, and intra prediction module 132. The output of motion estimation module 190 is provided to motion compensation module 192, whose output is selectively provided, along with the output of intra prediction module 132, to adder module 180. Adder module 180 combines the output of filter 122 with the output of either motion compensation module 192 or intra prediction module 132. That is, the output of the output of either motion compensation module 192 or intra prediction module 132 is combined with the filtered input video frames 108 and taken through a transform process (T) at transform module 170, such as a forward discrete cosine transform (fDCT) module, and a quantization process (Q) at quantization module 172. The quantized data output by quantization module 172 is provided to entropy module 174 and also processed through an inverse quantization process ($Q^{-1}$) and an inverse transform process ($T^{-1}$), such as iDCT. The inversely transformed data is then combined with the motion compensation output or intra prediction module 132 output to generate reference frames 109 that are provided to decoded buffer 130 for storage, whose output is used as input for motion estimation (in motion estimation module 190) and motion compensation module 192. The output of quantization module 172 is provided to entropy module 174, that generates the encoded output frame 140 that has been reduced in bandwidth by analysis module 120 and filter 122 for use by decoder 150 on display 160. In various embodiments, the entropy of pixels of the input video frame 102 for each macroblock, sub-block, or locality have been modified, deleted, or reduced adaptively, thereby reducing the bandwidth utilized by encoder 110 and by reducing the number of bits in areas that are perceptually unnoticeable or acceptable by the viewer of the video content on display 160.

Figure 2:
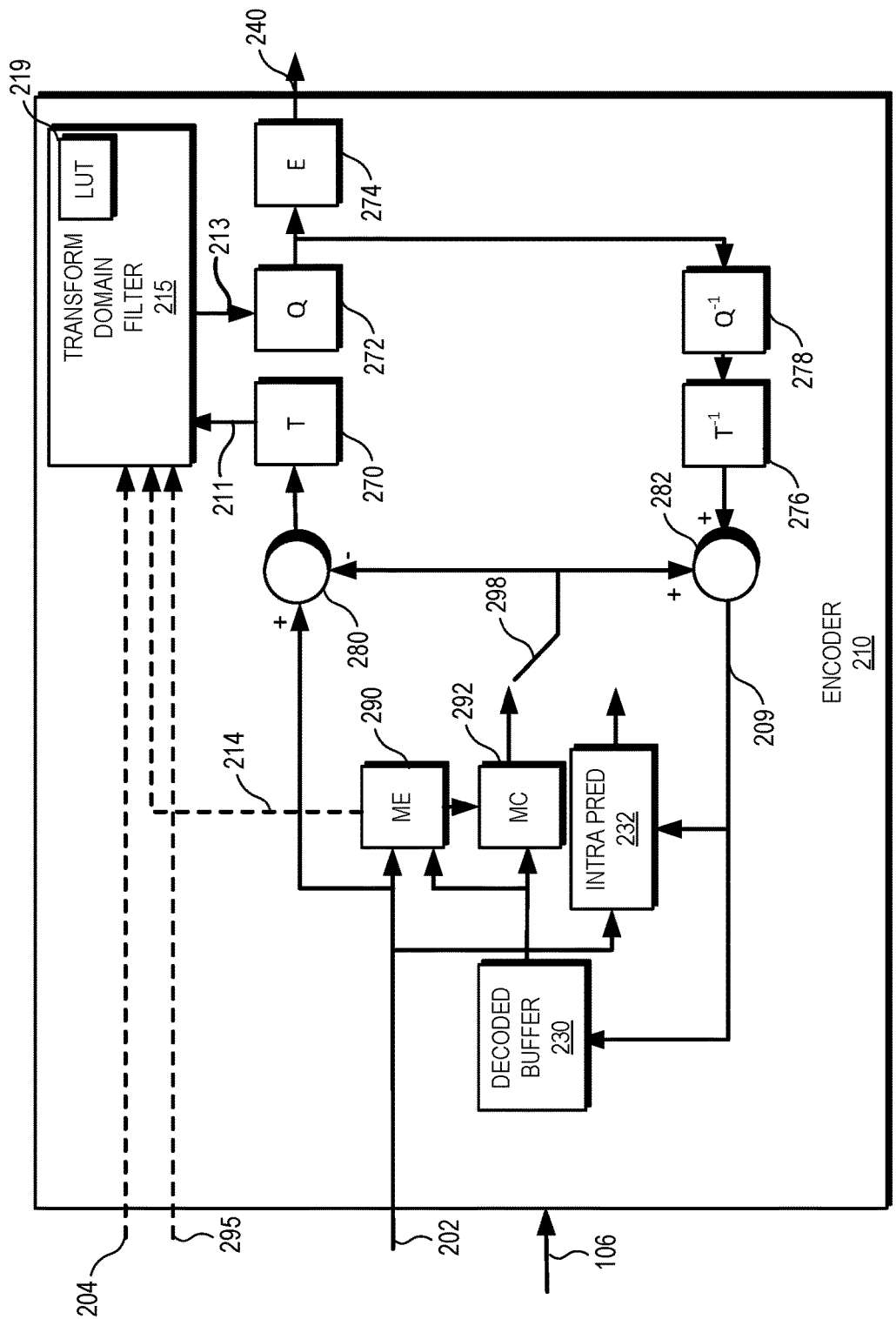
FIG. 2 is a block diagram of an encoding system configured to encode video based on transform domain filtering in accordance with some embodiments.

FIG. 2 illustrates a block diagram of an encoding system 200 configured to encode video based on transform domain filtering in accordance with some embodiments. Encoder 210 includes a transform domain filter 215, a decoded buffer 230, an ME module 290, an MC module 292, an intra prediction module 232, a switching module 298, an adder module 280, an adder module 282, a transform module 270, a quantization module 272, an inverse transform module 276, an inverse quantization module 278, and an entropy module 274.

During operation, an input video frame 202 is presented at encoder 210 for encoding. The motion estimation module 290, adder module 280, and intra prediction module 232 receive the input video frame 202. Intra prediction module 232, whose function is to predict pixels or macroblocks in the current input video frame 202 from similar pixels or macroblocks in reference frames 209, uses the input video frame 202 and output of adder 282 to generate a prediction macroblock. The intra prediction output (prediction macroblock) is provided to adder module 280 and adder module 282. When using motion compensation, MC module 292 uses the output of ME module 290 (which locates a macroblock in reference frame 209 that closely matches the current macroblock in the input video frame 202 and generates a motion vector that is provided to MC module 292) to generate a motion compensated prediction macroblock.

Adder module 280 receives the current macroblock from the input video frame 202 and the prediction macroblock (output of the intra prediction module 232 or MC module 292) and subtracts the prediction macroblock from the current macroblock to generate a residual macroblock. Adder module 280 provides the residual macroblock to transform module 270. Transform module 270 uses a transform process such as, for example, a forward discrete cosine transform (fDCT), to generate a set of transform coefficients 211 that are in the frequency or transform domain. However, instead of being provided directly to quantization module 272 as is typical in the art, the transform coefficients 211 are provided to transform domain filter 215 to be altered or zero'd out in order to reduce the bandwidth required of encoder 210. Thus, the input to transform domain filter 215 are the transform coefficients 211 from transform module 270 that are to undergo entropy reduction.

In various embodiments, transform domain filter 215 receives the transform coefficients 211 and, in order to commence the process of data reduction by encoder 210, determines the energy associated with each transform coefficient. Transform domain filter 215 determines the energy associated with a transform coefficient of transform coefficients 211 using, for example, a heuristic algorithm. That is, transform domain filter 215 may use the heuristic algorithm to determine the amount of energy associated with the varying frequencies (e.g., low frequency and high frequency) of the received transform coefficients 211. In various embodiments, the amount of energy associated with a transform coefficient is indicative of the perceptual importance of the underlying video content. Thus, making such an energy determination allows transform domain filter 215 to decide whether to zero out or alter the transform coefficient using the perceptual importance of the transform coefficient input into transform domain filter 215.

In various embodiments, in order to determine the perceptual importance using the results of the energy determination, transform domain filter 215 compares the energy of the transform coefficient with an energy look-up table 219 containing the energy associated with prior transform coefficients. Based on the results of the comparison, transform domain filter 215 is able to determine whether to zero-out, alter, or not zero-out the transform coefficient prior to providing the altered transform coefficients 213 to quantization module 272 for quantization.

In various embodiments, when transform domain filter 215 determines the perceptual importance of the transform coefficient is of significance (based on the amount of energy associated with the transform coefficient being, for example, above a certain energy amount or being listed as perceptually important in the look-up table 219), the transform coefficient remains unchanged and is not altered or removed by transform domain filter 215 before being provided to quantization module 272. When transform domain filter 215 determines the perceptual importance of the transform coefficient is insignificant, i.e., the amount of energy associated with the transform coefficient is below a certain energy amount listed in the look-up table 219 as being perceptually unimportant, the transform coefficient is zero'd-out or adjusted such that, when quantized by quantization module 272, the quantized data is represented by a reduced number of bits. The altered or unaltered transform coefficients 213 are then provided to quantization module 272. The encoding process then continues at a reduced entropy rate using quantization module 272. The output of quantization module 272 is provided to entropy module 274 and inverse quantization module 278.

After generating the reduced entropy transform coefficients 213, transform domain filter 215 provides the transform coefficients 213 to quantization module 272 that executes the quantization process (Q) and generates quantized data. In addition to quantized data being processed by entropy module 274 to generate encoded frame 240, quantization data is processed through the inverse quantization process ($Q^{-1}$) at inverse quantization module 278 and an inverse transform process ($T^{-1}$) at inverse transform module 276. The inversely transformed data is then combined with the motion compensation output or intra prediction module 232 output to generate reference frames 209 that are provided to decoded buffer 230 for storage, whose output is used as input for motion estimation (in motion estimation module 290) and motion compensation module 292. The output of quantization module 272 is provided to entropy module 274 to be used to generate the encoded output frame 240 for use by decoder 150 on display 160 of FIG. 1.

In addition to using the transform coefficients 211 for data reduction, in some embodiments transform domain filter 215 uses the filter settings 295, analysis input 204, and motion estimation output 214 for data reduction. In various embodiments, the filter settings 295 provided to transform domain filter 215 may, for example, dictate the type of algorithm to be used when determining the perceptual importance of the transform coefficient 211. The analysis input 205 may provide information that is used by transform domain filter 215 to adjust or provide the energy settings in look-up table 217. For example, analysis input 205 may provide the values in look-up table 219 that are indicative of being insignificant (e.g., a transform coefficient indicative of a cloud setting or nighttime setting), thereby dictating that the corresponding transform coefficients are insignificant. In various embodiments, a quality setting may be used to render the perceptual importance of a block or sub-block of the input video frame 202 and to control the adaptive filtering performed by transform domain filter 215. That is, a bit or bits located in, for example, look-up table 219 associated with transform domain filter 215 or provided in the filter settings 113 may dictate whether transform domain filter 215 performs filtering or the level of filtering performed by transform domain filter 215. In various embodiments, transform domain filter 215 uses analysis input 204, filter settings 295, or motion estimation output 214 from motion estimation module 290, or combination thereof, to adjust the quality setting.

In various embodiments, whether or not a transform coefficient is zero'd-out or altered may be based the amount of error associated with or permitted for the macroblock that is currently being evaluated by transform domain filter 215. That is, the error introduced by zeroing out or altering a transform coefficient may be required to fit within a permitted error amount provided by filter setting 213 or in the look-up table 219. The permitted error amount may be based on, for example, the human visual system, where errors are permitted for portions of the macroblocks that have transform coefficients associated with visual content that are less sensitive to errors, such as losses at higher frequencies imperceptible to the human eye. In various embodiments, the permitted error for the macroblock or sub-block being evaluated may be a transfer function, where at least one of the following parameters are evaluated by the transfer function: motion parameters provided by motion estimation output 214 from ME module 290; motion parameters provided by analysis module 120 of FIG. 1; and energy or noise within specific frequencies evident by transform coefficients 211. In various embodiments, the error parameters may be measured using, for example, decibels (dB), mean square error (MSE), Structural Similarity Index (SSIM), or other well-known metric measuring units as are generally known in the art.

Since transform domain filter 215 is able to estimate the perceptual importance of the transform coefficients that are related to a macroblock or sub-block of the input video frame 202 (as indicated by an assessment of the transform or frequency coefficients by transform domain filter 215), transform domain filter 215 is able to perform adaptive filtering that reduces bits in areas of the input video frames 202 that are perceptually unnoticeable, acceptable, or tolerable to a user of the video image. Thus, transform domain filter 215 is configured to adaptively determine activity or strength of a range of frequencies and selectively alter the data from the transform module 270 before passing the altered data to the quantization module 272.

Figure 3:
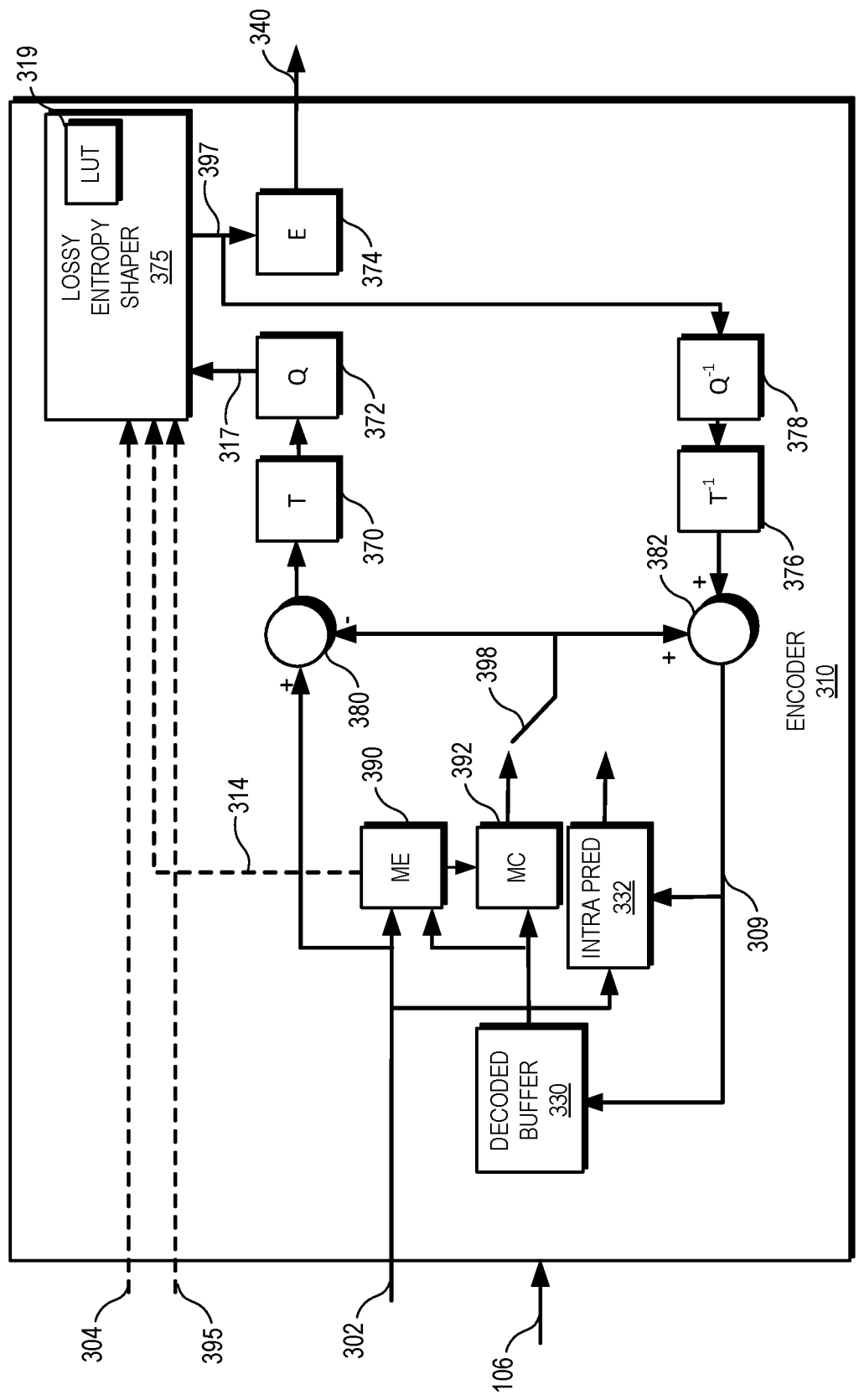
FIG. 3 is a block diagram of an encoding system configured to encode video based on lossy entropy shaping in accordance with some embodiments.

FIG. 3 illustrates a block diagram of an encoding system 300 configured to encode video based on lossy entropy shaping in accordance with some embodiments. Encoder 310 includes a lossy entropy shaper 375, a decoded buffer 330, an ME module 390, an MC module 392, an intra prediction module 332, a switching module 398, an adder module 380, an adder module 382, a transform module 370, a quantization module 372, an inverse transform module 376, an inverse quantization module 378, and an entropy module 374.

During operation, an input video frame 302 is presented at encoder 310 for encoding. The motion estimation module 390, adder module 380, and intra prediction module 332 receive the input video frame 302. Intra prediction module 332 uses the input video frame 302 and output of adder 382 to generate a prediction macroblock. The intra prediction output (prediction macroblock) is provided to adder module 380 and adder module 382. When using motion compensation, MC module 392 uses the output of ME module 390 to generate a motion compensated prediction macroblock that is provided to adder module 380 and adder module 382.

Adder module 380 receives the current macroblock from the input video frame 302 and the prediction macroblock (output of the intra prediction module 332 or MC module 392) and subtracts the prediction macroblock from the current macroblock to generate a residual macroblock. Adder module 380 provides the residual macroblock to transform module 370. Transform module 370 receives the residual macroblock and generates a set of transform coefficients for use by quantization module 372. The transform coefficients are provided to quantization module 372 to generate quantized transform coefficients 317. The quantized transform coefficients 317 are provided to lossy entropy shaper 375 as an original set of quantized transform coefficients for entropy reduction.

Lossy entropy shaper 375 receives the original set of quantized transform coefficients 317, and in some embodiments, analysis output 304 and motion estimation output 314, in order to generate lossy entropy shaper output 397 (lossy or altered quantized transform coefficients 397). Lossy entropy shaper 375 adjusts or zeros out a quantized transform coefficient of the original set of quantized transform coefficients 317 and creates a set of altered quantized transform coefficients. In various embodiments, a set of heuristics or algorithm may be used to zero out, alter, or reduce the quantized transform coefficient, such as, for example, quantized transform coefficients that represent higher frequencies. In some embodiments, a plurality of sets of altered quantized transform coefficients may be created by lossy entropy shaper 375. Lossy entropy shaper 375 determines a metric (e.g., SSIM, MSE, or PSNR, or other metric) of the original set of quantized transform coefficients and the set of altered quantized transform coefficients. For example, in various embodiments, each coefficient or sets of quantized transform coefficients is tested to determine the encoded size in bits, PSNR, SSIM, or other metric.

The metric of the original set of quantized transform coefficients 317 is compared to the metric of a first set of altered quantized transform coefficients in order to shape the received quantized transform coefficients 317 to generate the entropy reduced lossy quantized transform coefficients 397. In various embodiments, lossy entropy shaper 375 compares the set of original quantized transform coefficients 317 to a set or series of sets or blocks of quantized transform coefficients that have a reduced encoding size compared to the received block of quantized transform coefficients 317. In various embodiments, the sets of quantized transform coefficient blocks and the metrics associated with the sets of quantized transform coefficient blocks are stored in, for example, a look-up table 319 associated with lossy entropy shaper 375. In various embodiments, the series of sets or blocks located in look-up table 319 includes, for example, a first set of quantized transform coefficients, a second set of quantized transform coefficients, and a third set of quantized transform coefficients. In various embodiments, the first set of quantized transform coefficients, second set of quantized transform coefficients, and third set of quantized transform coefficients differ from the original set of quantized transform coefficients 317 by one, two, or three coefficients. In various embodiments, look-up table 319 may include an additional or reduced number of sets of quantized transform coefficients depending on, for example, the processing capabilities of the processor use for encoder 310.

In various embodiments, when the metric associated with the set of altered quantized transform coefficients exceeds a quality requirement or threshold, the altered quantized transform coefficients are provided as the lossy entropy shaper output 397. In various embodiments, when metric associated with the set of altered quantized transform coefficients does not exceed the quality requirement or threshold, the original altered quantized transform coefficients (and not the altered quantized transform coefficients) are provided as the lossy entropy shaper output 397. In various embodiments, the set of quantized transform coefficients that is selected is the set of quantized transform coefficients that has the lowest encoded size and meets the quality requirement. In various embodiments, the quality requirement may be a static number (e.g., 35 dB) that is selected for the product or use-case. In various embodiments, the quality requirement may be an adaptive number, based on, for example, analog output 304 or and motion estimation output 314. In various embodiments, based on, for example, a minimum local perceptual quality (i.e., the acceptable visual quality of encoder 310), lossy entropy shaper 375 may select one of the first, second, or third blocks of quantized transform coefficients to replace the quantized transform coefficients 317 that are provided to entropy module 374 to reduce the amount of data output by the encoder.

In various embodiments, lossy entropy shaper 375 selects the block set or set of altered of quantized transform coefficients based on, for example, estimating the local error associated with the selected block of quantized transform coefficients, the number of bits saved by selecting the alternative set of quantized transform coefficients, or the return on investment (ROI) provided by the selected set of quantized transform coefficients, or combination thereof. In various embodiments, a single or multiple sets of alternative quantized transform coefficients may be examined. In various embodiments, the ROI may be determined by assessing whether the minimum local perceptual quality has been attained.

In various embodiments, in order to select the quantized transform coefficients that are included in the alternative block of quantized transform coefficients, lossy entropy shaper 375 examines the quantized transform coefficients 317 provided from quantization module 372 to determine which transform coefficient (and thus the associated bit stream), if any, within the quantized data may be zero'd out prior to being provided to entropy module 374. The lossy entropy shaper 375 may use, depending on type of assessment made by lossy entropy shaper 375, the heuristic algorithm described above, a regressive model, or machine learning to determine which quantized transform coefficient (and associated bits) may be adjusted in the block of quantized transform coefficients. In various embodiments, lossy entropy shaper 375 uses metrics stored in LUT 319 or provided to lossy entropy shaper 375 by filter settings 395 to determine which quantized transform coefficient in the alternative block of quantized transform coefficients are insignificant and not necessary for entropy module 374 to generate acceptable video content. The output of lossy entropy shaper 375, i.e., lossy quantized transform coefficients 397, are provided to entropy module 374, which may be, for example, a standards-compliant entropy module.

In various embodiments, lossy entropy shaper 375 is configured to perform the adaptive filtering described above in the frequency space or transform space including, for example, selective transform coefficient removal and alternative quantize transform coefficient set selection. In various embodiments, lossy entropy shaper 375 is configured to evaluate both the error introduced by selecting the alternative set of transform coefficients and the number of bits saved by selecting the alternative set of transform coefficients (i.e., the introduced error and saved bits in the output bitstream) for the reduced set of quantized transform coefficient alternatives. In various embodiments, the alternative set of quantized transform coefficients may be selected based upon a strength parameter provided from filter settings 395, where the strength parameter indicates the weight associated with the transform coefficient. In various embodiments, the strength parameter may be, for example, a set of parameters that are defined for each local region and may be adaptive based on, for example, various criteria that indicate the weight associated with the transform coefficient. In various embodiments, weights provided by the filter settings 395 to lossy entropy shaper 375 may be used to provide an assigned value to the metrics. The weights may be user-controlled weights or coefficients that weigh the metrics used in data reduction, where the coefficients relate to each metric using a transfer function.

After performing the coefficient modification using lossy entropy shaping, lossy entropy shaper 375 provides the lossy entropy shaper output 397 to entropy module 374 and inverse quantization module 378. In addition to lossy entropy shaper output 397 being processed by entropy module 374 to generate encoded frame 340, lossy entropy shaper output 397 is processed through the inverse quantization process ($Q^{-1}$) at inverse quantization module 378 and an inverse transform process ($T^{-1}$) at inverse transform process module 376. The inversely transformed data is then combined with the motion compensation output or intra prediction module 332 output to generate reference frames 309 that are provided to decoded buffer 330 for storage, whose output is used as input for motion estimation (in motion estimation module 390) and motion compensation module 392. The output of lossy entropy shaper 375 is provided to entropy module 374 to generate the encoded output frame 340 for use by, for example, decoder 150 of display 160 of FIG. 1.

In various embodiments, encoder 310 of FIG. 3 or encoder 210 of FIG. 2 or combination thereof may be used in the data reduction process configuration depicted in FIG. 1. For example, encoder 210 and encoder 310 may receive as input video frames 202, filtered frames 108, and proceed with performing the data reduction encoding process stated above and referenced in FIGS. 2 and 3. That is, the data reduction processes described in both FIG. 1, FIG. 2, and FIG. 3 may be combined to provide a dual or triple data reduction process, taking advantage of the data reduction processes of the configurations depicted in FIG. 1, FIG. 2, and FIG. 3.

Figure 4:
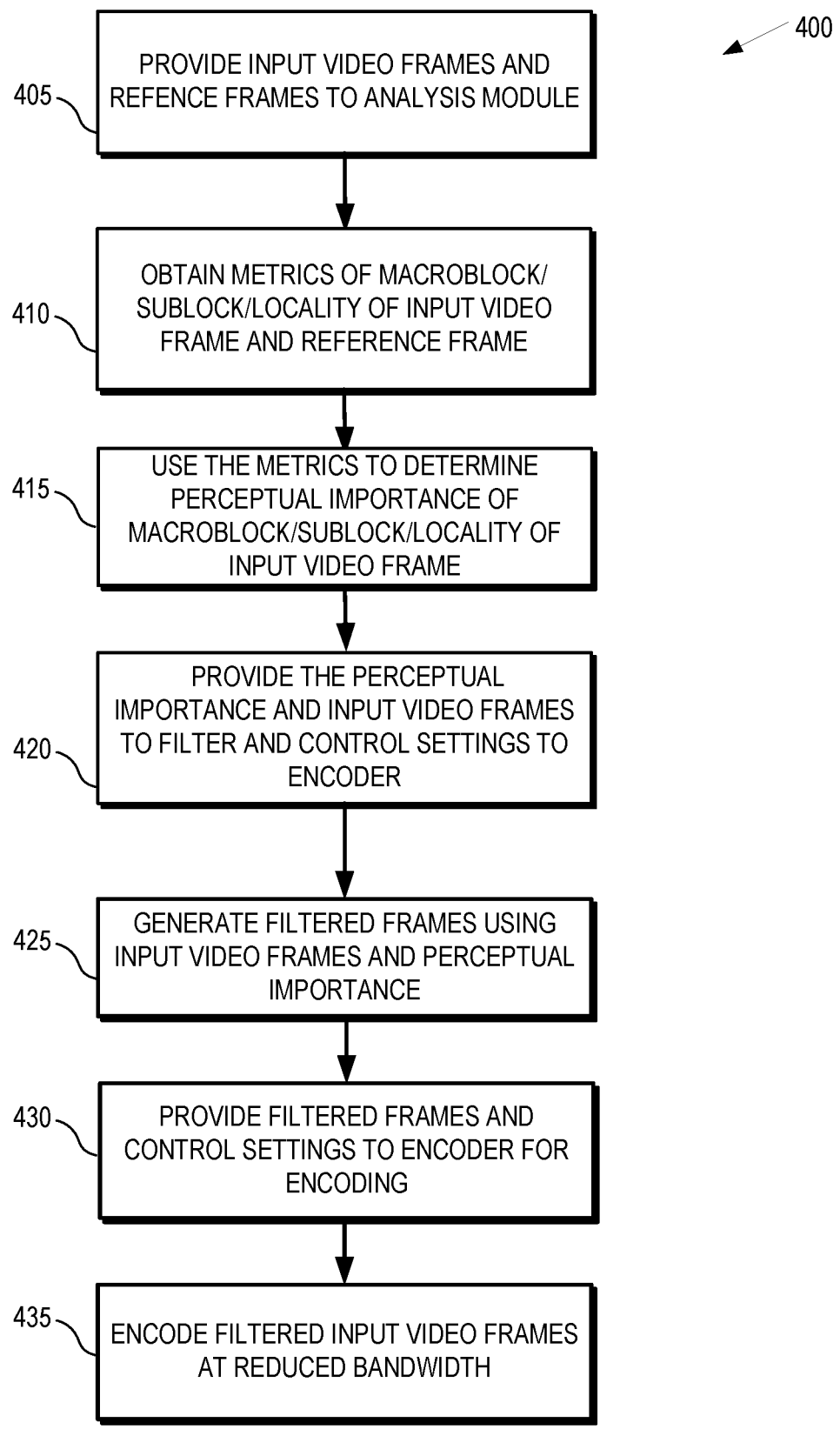
FIG. 4 is a flow diagram illustrating a method for encoding video based on pre-encoding analysis and filtering in accordance with some embodiments.

FIG. 4 depicts a method for 400 for encoding video based on pre-encoding analysis and filtering in accordance with some embodiments. With reference to FIG. 1, at block 405, an input video frame 102 and a reference frame 109 is provided to analysis module 120 of data reduction module 115. At block 410, metrics of a macroblock, sub-block, or a locality of the input video frame 102 and the reference frame 109 are obtained. At block 415, the metrics are utilized by analysis module 120 to determine the perceptual importance of the macroblock, sub-block, or locality of the input video frame 102. At block 420, control settings 106 are provided to encoder 110 and the macroblock, sub-block, or locality and perceptual importance of the macroblock, sub-block, or locality is provided to filter 122 as analysis output 104. At block 425, filtered frames 108 are generated that may or may not have been altered based on the perceptual importance indicated by analysis output 104 and corresponding macroblock, sub-block, or locality of input video frame 102. At block 430, the filtered frames 102 and control settings 106 are provided to encoder 110. At block 430, encoder 110 encodes the filtered frames 102 at a reduced bitrate or bandwidth.

Figure 5:
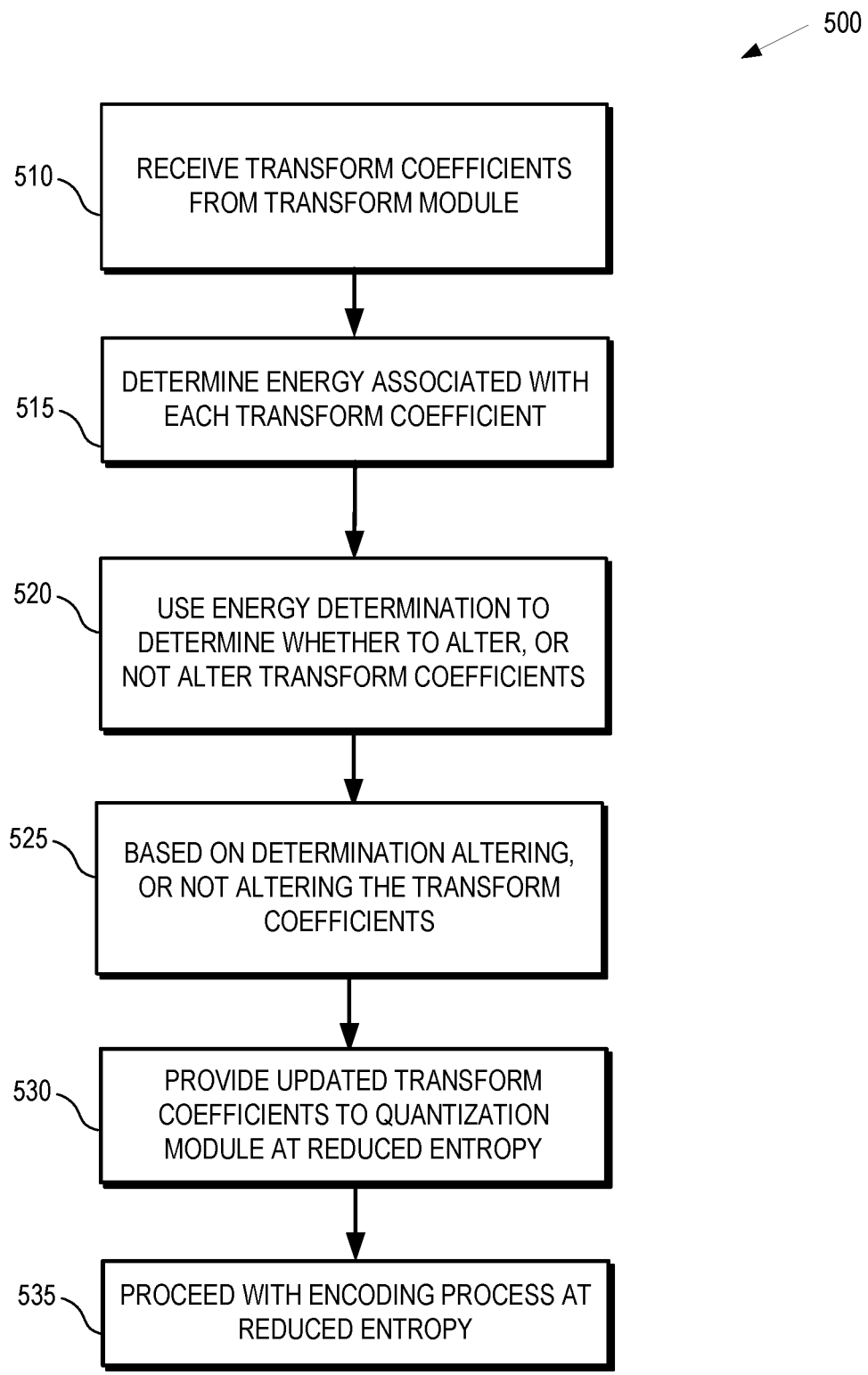
FIG. 5 is a flow diagram illustrating a method for encoding video based on transform domain filtering in accordance with some embodiments.

FIG. 5 depicts a method 500 for encoding video based on transform domain filtering in accordance with some embodiments. With reference to FIG. 2, at block 510, transform coefficients 211 are received at transform domain filter 215 from transform module 270 to commence data reduction. At block 515, the energy associated with the transform coefficients 211 are determined. At block 520, the energy determined for the transform coefficients is used to determine whether to zero out, alter, or not alter the corresponding transform coefficient of transform coefficients 211. At block 525, based on the results of the determination, the corresponding transform coefficient of transform coefficients 211 is either zero'd, altered, or not altered. At block 530, the updated transform coefficients 213 are provided to quantization module 272 at a reduced bitrate for quantization. At block 535, the encoding process continues in encoder 210 at the reduced bitrate.

Figure 6:
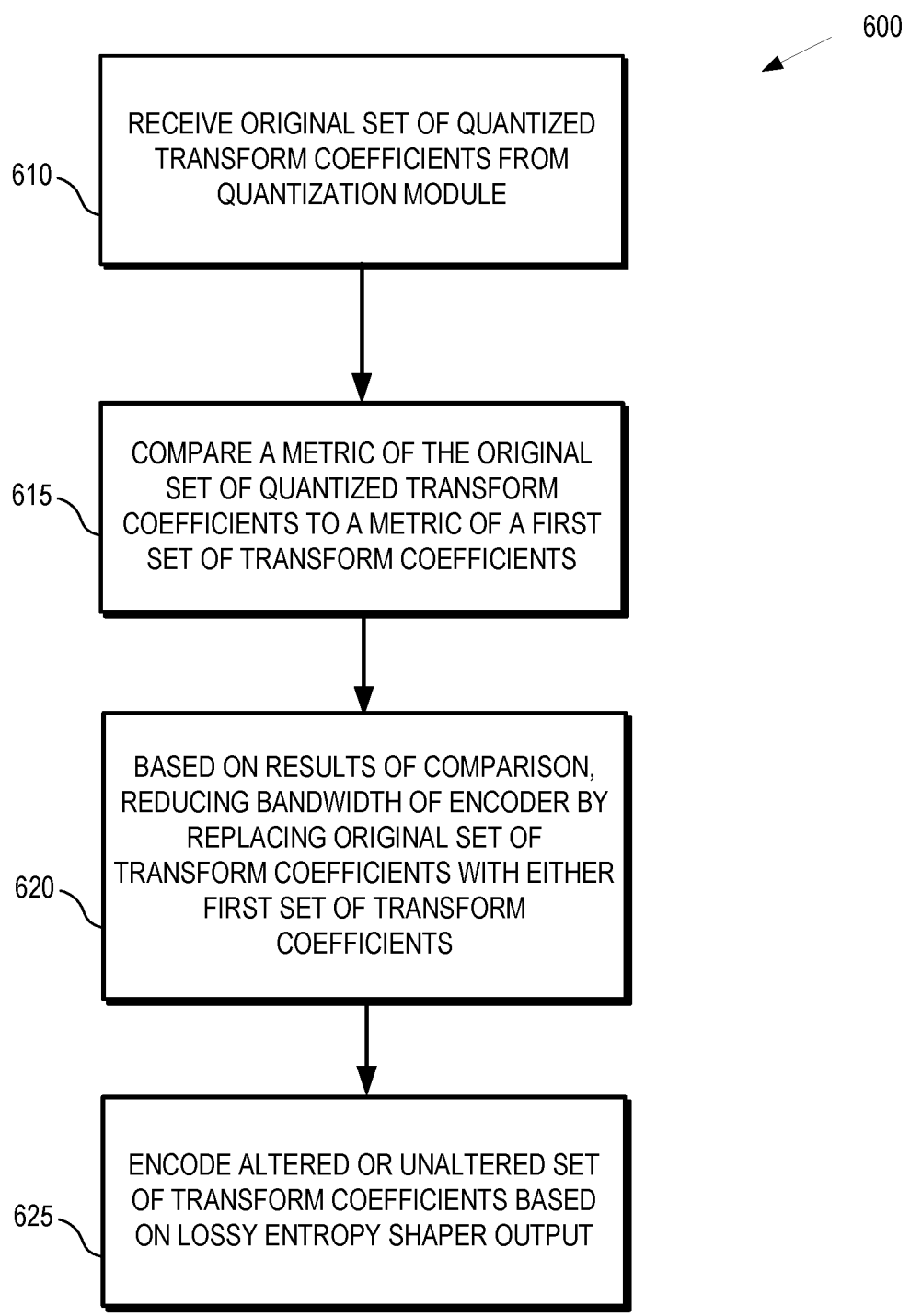
FIG. 6 is a flow diagram illustrating a method for encoding video based on lossy entropy shaping in accordance with some embodiments.

FIG. 6 depicts a method 600 for encoding video based on lossy entropy shaping in accordance with some embodiments. With reference to FIG. 3, at block 610, an original set of quantized transform coefficients 317 are received at lossy entropy shaper 375 from quantization module 372. At block 615, the original set of quantized transform coefficients 317 are compared to a first set of altered quantized transform coefficients and a second set of altered quantized transform coefficients derived indirectly using LUT 319. At block 620, based on the results of the comparison at block 615, the bandwidth of encoder 310 is can be reduced by replacing the original set of quantized transform coefficients 317 with either the first set of altered quantized transform coefficients or the second set of altered quantized transform coefficients that shall result in reduced bitrate compared to the original set of quantized transform coefficients 317. At block 625, when either the first set of altered quantized transform coefficients or the second set of altered quantized transform coefficients is selected, the altered set of quantized transform coefficients 397 are encoded by encoder 310 at the reduced bitrate.

In various embodiments, a method includes: obtaining, at a data reduction module, metrics of a first block of an input video frame and a second block of a reference frame; determining, at the data reduction module, a perceptual importance of the first block of the input video frame using the metrics; and adjusting, at the data reduction module, an entropy of the input video frame provided to an encoder based on the perceptual importance of the first block of the input video frame. In various embodiments of the method, the metrics include a first metric associated with the first block and a second metric associated with the second block. In various embodiments of the method, determining the perceptual importance of the first block of the input video frame includes: calculating, at an analysis module, a difference between the first metric associated with the first block with the second metric associated with the second block; and comparing the difference with a plurality of difference values located in a look-up table (LUT) that are indicative of perceptual performance. In various embodiments of the method, in response to the difference being less than a first difference value of the plurality of difference values, the method includes identifying the first block as not perceptually important, and in response to the difference being greater than the first difference value, identifying the first block as perceptually important. In various embodiments, other techniques may be used to render the difference value specified above, such as, for example, using an equation or a trained machine to ascertain the difference value and render the significance decision (i.e., perceptually important or not perceptually important).

In various embodiments of the method, responsive to identifying the first block as not perceptually important, the method includes removing the first block from the input video frame, and responsive to identifying the first block as perceptually important, maintaining the first block in the input video frame. In various embodiments of the method, the first metric and second metric are indicative of at least one of a contrast content, flesh-tone content, memory color content, frequency content, energy content, and motion content of the first block of the input video frame and the second block of the reference frame. In various embodiments, the method further includes generating a control setting indicative of a bit-rate or quality of the first block, the control setting to control the bit-rate of the encoder or the quality of the input video frame provided to the encoder. In various embodiments of the method, the first block and second block each is a macroblock, sub-block, or a locality. In various embodiments of the method, adjusting the entropy includes using a low-pass filter to reduce the entropy on the input video frame. In various embodiments, in removing the first block from the input video frame, highly detailed areas may be removed. In various embodiments, in removing the first block from the input video frame, perceptually flat areas may be removed, which may include areas deemed unimportant, such as, for example, flat walls, etc.

In various embodiments, a method includes: obtaining a plurality of transform coefficients from a transform module; determining, at a transform domain filter, an energy associated with each transform coefficient of the plurality of transform coefficients; and reducing a bandwidth of an encoder based on the energy determination of each transform coefficient of the plurality of the transform coefficients. In various embodiments of the method, reducing the bandwidth of the encoder based on the energy determination includes comparing the energy associated with each transform coefficient of the plurality of transform coefficients to a specified amount of energy in an energy look-up table (LUT). In various embodiments, the method further includes altering at least one of the plurality of transform coefficients to an altered transform coefficient value based on the comparing of the energy associated with each transform coefficient to the specified amount of energy in the energy LUT. In various embodiments, the method further includes using a heuristic algorithm to determine the energy associated with each transform coefficient of the plurality of transform coefficients. In various embodiments of the method, the transform domain filter uses a quality setting to determine whether to reduce the bandwidth. In various embodiments, the method further includes altering at least one of the plurality of transform coefficients to an altered transform coefficient value based on a permissible error amount of the encoder. In various embodiments of the method, a low-pass filter is used to alter the transform coefficient.

In various embodiments, an encoder includes a quantization module, a lossy entropy shaper coupled to the quantization module, and an entropy module coupled to the lossy entropy shaper. The lossy entropy shaper obtains an original set of quantized transform coefficients from the quantization module. The lossy entropy shaper compares an original metric of the original set of quantized transform coefficients to at least a first metric of a first set of altered quantized transform coefficients, and as a result of the comparison, provides either the original set of quantized transform coefficients or the first set of altered quantized transform coefficients, the first set of altered quantized transform coefficients providing a reduced entropy compared to the original set of quantized transform coefficients. In various embodiments of the encoder, the lossy entropy shaper determines a number of quantized transform coefficients that may be adjusted in order to select the first set of altered quantized transform coefficients. In various embodiments of the encoder, the lossy entropy shaper selects at least one of the first set of altered quantized transform coefficients and a second set of quantized altered transform coefficients based on the determination of the number of quantized transform coefficients that may be adjusted. In various embodiments of the encoder, the lossy entropy shaper uses a heuristic algorithm to determine which quantized transform coefficient in the first set of altered quantized transform coefficients to alter.

In various embodiments, an apparatus includes an analysis module, a filter coupled to the analysis module, and an encoder coupled to the filter. The analysis module obtains metrics of a first block of an input video frame and a second block of a reference frame, and based on the metrics, determines a perceptual importance of the first block of the input video frame, the perceptual importance being used by the filter to adjust an entropy of the input video frame provided to the encoder. In various embodiments of the apparatus, the metrics include a first metric associated with the first block and a second metric associated with the second block. In various embodiments of the apparatus, the perceptual importance of the first block of the input video frame is determined by calculating, at the analysis module, a difference between the first metric associated with the first block with the second metric associated with the second block and comparing the difference with a plurality of difference values located in a look-up table (LUT) that are indicative of perceptual performance.

In various embodiments, if the metrics of the first block are spatial, a reference frame may not be required and the importance map may be determined based on local/spatial metrics. In various embodiments, the metrics may be adaptive and have an associated model that specifies if the region should be filtered or not. The features (or the whole region) may be introduced as input to the model and the model produces strengths of the filter. A direct relationship may not be known between the feature set and the output, but there may be a non-linear relationship based on various parameters, including, for example, the training dataset and the manner in which the model is trained.

In some embodiments, the apparatus and techniques described above are implemented in a system including one or more integrated circuit (IC) devices (also referred to as integrated circuit packages or microchips), such as the encoding system described above with reference to FIGS. 1-6. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   obtaining, at a data reduction module, metrics of a first block of an input video frame to be an input to an encoder and a second block of an encoding reference frame, the encoding reference frame being fed back to the data reduction module from a quantization module of the encoder;
   determining, at the data reduction module, a perceptual importance of the first block of the input video frame to be an input to the encoder using the metrics; and
   adjusting, at the data reduction module, an entropy of the input video frame to be an input to the encoder based on the perceptual importance of the first block of the input video frame to be an input to the encoder.

2. The method of claim 1, wherein:
   the metrics include a first metric associated with the first block and a second metric associated with the second block.

3. The method of claim 2, wherein:
   determining the perceptual importance of the first block of the input video frame to be an input to the encoder comprises:
      calculating, at an analysis module, a difference between the first metric associated with the first block with the second metric associated with the second block; and
      comparing the difference with a plurality of difference values indicative of perceptual performance.

4. The method of claim 3, wherein:
   in response to the difference being less than a first difference value of the plurality of difference values, identifying the first block as not perceptually important, and in response to the difference being greater than the first difference value, identifying the first block as perceptually important.

5. The method of claim 4, wherein:
   responsive to identifying the first block as not perceptually important, removing the first block from the input video frame to be an input to the encoder, and responsive to identifying the first block as perceptually important, maintaining the first block in the input video frame to be an input to the encoder.

6. The method of claim 2, wherein:
   the first metric and second metric are indicative of at least one of a contrast content, flesh-tone content, memory color content, frequency content, energy content, and motion content of the first block of the input video frame to be an input to the encoder and the second block of the encoding reference frame.

7. The method of claim 1, further comprising:
   generating a control setting indicative of a bit-rate or quality of the first block, the control setting to control the bit-rate of the encoder or the quality of the input video frame to be an input to the encoder.

8. The method of claim 1, wherein:
   the first block and second block each is a macroblock, sub-block, or a locality.

9. The method of claim 2, wherein:
   adjusting the entropy comprises using a low-pass filter to reduce the entropy on the input video frame to be an input to the encoder.

10. A method, comprising:
    obtaining a plurality of transform coefficients from a transform module;
    determining, at a transform domain filter, an energy indicating a visual importance of video content associated with each transform coefficient of the plurality of transform coefficients; providing altered transform coefficients to a quantization module from the transform domain filter; and reducing a bandwidth of an encoder based on the energy determination of each transform coefficient of the plurality of the transform coefficients.

11. The method of claim 10, wherein:
    reducing the bandwidth of the encoder based on the energy determination comprises:
       comparing the energy associated with each transform coefficient of the plurality of transform coefficients to a specified amount of energy.

12. The method of claim 11, further comprising:
    altering at least one of the plurality of transform coefficients to an altered transform coefficient value based on the comparing of the energy associated with each transform coefficient to the specified amount of energy.

13. The method of claim 11, further comprising:
    using a heuristic algorithm to determine the energy associated with each transform coefficient of the plurality of transform coefficients.

14. The method of claim 11, wherein:
    the transform domain filter uses a quality setting to determine whether to reduce the bandwidth.

15. The method of claim 11, further comprising:
    altering at least one of the plurality of transform coefficients to an altered transform coefficient value based on a permissible error amount of the encoder.

16. The method of claim 11, wherein:
    a low-pass filter is used to alter the transform coefficient.

17. An encoder, comprising:
    a quantization module;
    a lossy entropy shaper coupled to the quantization module, the lossy entropy shaper obtaining an original set of quantized transform coefficients from the quantization module; and
    an entropy module coupled to the lossy entropy shaper, wherein the lossy entropy shaper compares an original metric of the original set of quantized transform coefficients to at least a first metric of a first set of altered quantized transform coefficients, and as a result of the comparison, provides either the original set of quantized transform coefficients or the first set of altered quantized transform coefficients, the first set of altered quantized transform coefficients providing a reduced entropy compared to the original set of quantized transform coefficients.

18. The encoder of claim 17, wherein:
    the lossy entropy shaper determines a number of quantized transform coefficients that may be adjusted in order to select the first set of altered quantized transform coefficients.

19. The encoder of claim 18, wherein:
    the lossy entropy shaper selects at least one of the first set of altered quantized transform coefficients and a second set of quantized altered transform coefficients based on the determination of the number of quantized transform coefficients that may be adjusted.

20. The encoder of claim 19, wherein:
the lossy entropy shaper uses a heuristic algorithm to determine which quantized transform coefficient in the first set of altered quantized transform coefficients to alter.

21. An apparatus, comprising:
an analysis module;
a filter coupled to the analysis module; and
an encoder coupled to the filter, wherein the analysis module obtains metrics of a first block of an input video frame to be an input to the encoder and a second block of an encoding reference frame, the encoding reference frame being fed back to the analysis module from a quantization module of the encoder and based on the metrics, determines a perceptual importance of the first block of the input video frame to be an input to the encoder, the perceptual importance being used by the filter to adjust an entropy of the input video frame to be input to the encoder.

22. The apparatus of claim 21, wherein:
the metrics include a first metric associated with the first block and a second metric associated with the second block.

23. The apparatus of claim 22, wherein:
the perceptual importance of the first block of the input video frame to be input to the encoder is determined by calculating, at the analysis module, a difference between the first metric associated with the first block with the second metric associated with the second block and comparing the difference with a plurality of difference values indicative of perceptual performance.

* * * * *